United States Patent [19]

Miyamaru et al.

[11] 4,359,716
[45] Nov. 16, 1982

[54] METHOD AND APPARATUS FOR SENSING AIR PRESSURE IN PNEUMATIC SUSPENSION UNITS FOR VEHICLES

[75] Inventors: Yukio Miyamaru, Tokyo; Masayuki Kudou, Shiki; Yoshihiro Nakazawa, Asaka; Osamu Kikuchi, Saitama, all of Japan

[73] Assignee: Honda Giken Kogyo Kabushiki Kaisha, Tokyo, Japan

[21] Appl. No.: 186,917

[22] Filed: Sep. 15, 1980

[30] Foreign Application Priority Data

Sep. 20, 1979 [JP] Japan .................................. 54-120980
Jun. 4, 1980 [JP] Japan .................................. 55-75179

[51] Int. Cl.³ ...................... G08B 21/00; H01H 35/24
[52] U.S. Cl. ...................................... 340/60; 177/186; 180/290; 180/902; 307/10 R; 307/118; 340/626; 340/666
[58] Field of Search ............... 340/60, 52 R, 626, 666; 307/9, 10 R, 118; 177/136, 141, 186; 180/290, 902; 280/DIG. 1

[56] References Cited

U.S. PATENT DOCUMENTS 3,017,938 1/1962 Polich, Jr. .......................... 177/141
3,833,094 9/1974 Grossman ..................... 340/52 R X
4,164,664 8/1979 Kasiewicz ................ 280/DIG. 1 X

FOREIGN PATENT DOCUMENTS 1926749 11/1970 Fed. Rep. of Germany .... 340/52 R

Primary Examiner—Thomas A. Robinson
Assistant Examiner—Joseph E. Nowicki
Attorney, Agent, or Firm—Posnack, Roberts, Cohen & Spiecens

[57] ABSTRACT

A method and apparatus for sensing air pressure in pneumatic suspension units for a vehicle, such as a motorcycle, comprising: air pressure sensors capable of sensing air pressures in pneumatic suspension units to generate an output signal when the air pressures are below a predetermined level; a vehicle speed sensor capable of sensing vehicle speed to generate an output signal when the vehicle speed exceeds a predetermined level; a signal processor adapted to receive output signals from the pressure sensors and the vehicle speed sensor and generate an output when the air pressures in the pneumatic suspension units are below a predetermined level while the vehicle speed continues to be in excess of a predetermined level for more than a predetermined period of time. An indicating device produces an indicating signal when it receives an output signal from the signal processor.

12 Claims, 6 Drawing Figures

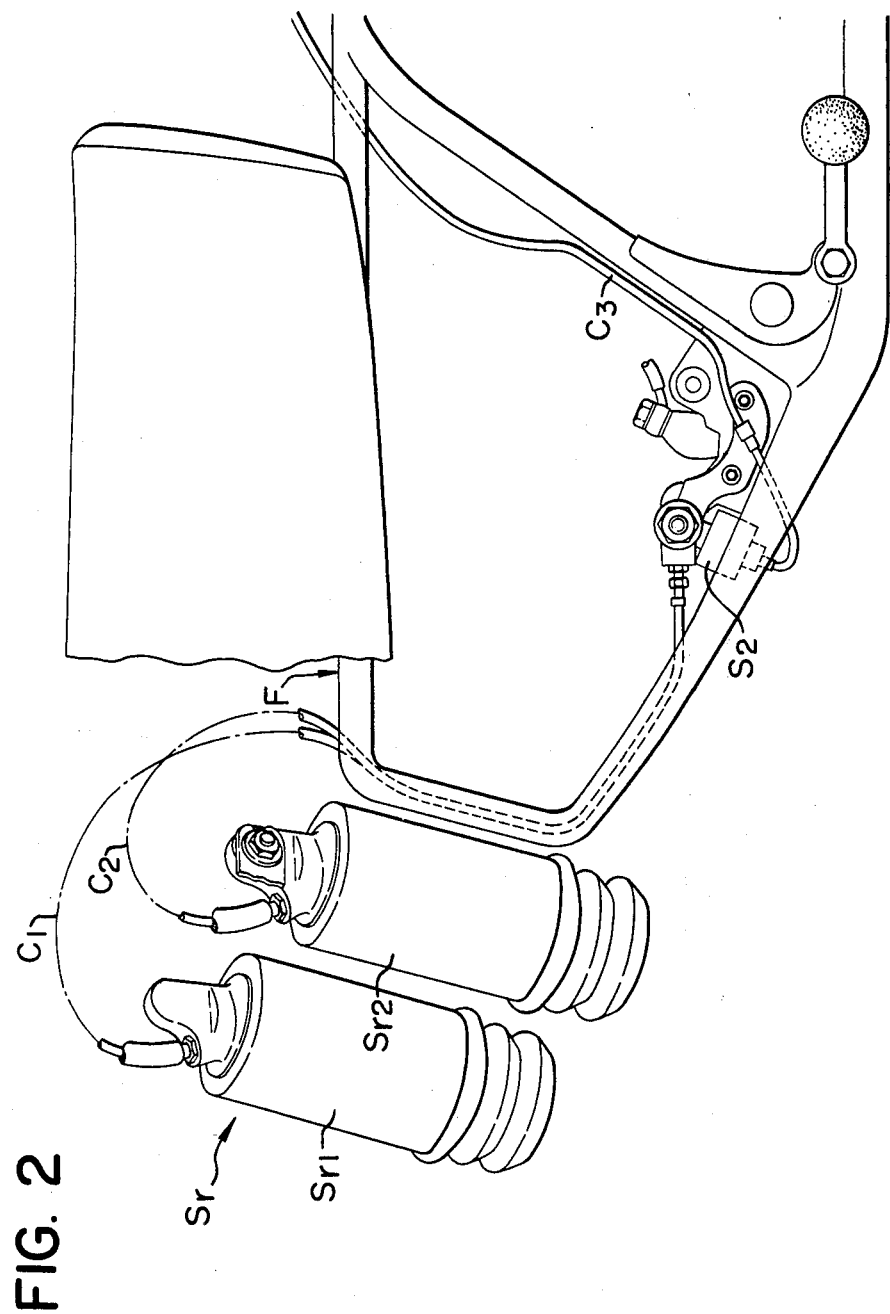

METHOD AND APPARATUS FOR SENSING AIR PRESSURE IN PNEUMATIC SUSPENSION UNITS FOR VEHICLES

FIELD OF THE INVENTION

The present invention relates to a method and a device for sensing air pressure in pneumatic suspension units for vehicles. The method and device are applicable to motorcycles whose front and rear wheels are suspended by front and rear pneumatic suspension units operated independently of each other and when the air pressure in the air suspension units is lowered below a definite level, the device can produce an indicating signal for the rider.

DESCRIPTION OF THE PRIOR ART

When a motorcycle is stopped on the road, the rider keeps it standing with his feet touching the ground. In such a case, the weight on the motorcycle is naturally less than that in the case where the motorcycle is traveling on the road with the rider's feet on the foot-rests.

A suitable air pressure in a pneumatic suspension unit should be determined taking the total weight on the motorcycle into consideration. Therefore, it is, in many cases, not proper to detect the air pressure in a pneumatic suspension unit when the motorcycle is stopped with the rider's feet touching the ground, and to assess whether the detected value is suitable or not.

SUMMARY OF THE INVENTION

An object of the present invention is to provide a method and device for sensing air pressure in pneumatic suspension units for vehicles, which permits sensing air pressure in a pneumatic suspension unit which continues to be below a predetermined level for more than a predetermined period of time while the vehicle is running at a speed higher than a predetermined speed, and immediately informing the rider or driver of the vehicle of such air pressure in the pneumatic suspension unit.

Another object of the present invention is to provide a method and device for sensing air pressure in a pneumatic suspension unit for vehicles, which permits sensing air pressures in front and rear pneumatic suspension units only when the vehicle is running with the total weight thereon applied to the vehicle, determining whether the air pressures are less than a definite level, and actuating an indicating device when the air pressures are less than said definite level.

To these ends, the present invention contemplates a device for sensing air pressure in pneumatic suspension units for vehicles, comprising: air pressure sensors capable of sensing air pressure in pneumatic suspension units to generate an output signal when the air pressures are below a predetermined level; a vehicle speed sensor capable of sensing vehicle speed to generate an output signal when the speed exceeds a predetermined level; a signal processor adapted to receive output signals from the air pressure sensors and the vehicle speed sensor to generate an output when the air pressures in the pneumatic suspension units are below a predetermined level while the vehicle speed continues to exceed a predetermined level for more than a predetermined period of time; and an indicating device adapted to receive an output signal from the signal processor to give an indication of air pressure below said predetermined level.

The above and other objects, features and advantages of the invention will become apparent from the following description of the preferred embodiments taken in conjunction with the accompanying drawings.

BRIEF DESCRIPTION OF THE DRAWINGS

FIG. 2 is a side elevational view partially in perspective of one embodiment of a rear pneumatic suspension unit and an air pressure sensor of the device shown in FIG. 1.

DESCRIPTION OF THE PREFERRED EMBODIMENTS

Several embodiments of the present invention will be described with reference to the accompanying drawings.

Referring to FIGS. 1-5, a motorcycle M has front and rear wheels Wf, Wr which are suspended from a frame F of the motorcycle M via front and rear pneumatic suspension units Sf,Sr, respectively. The front pneumatic suspension unit Sf is provided with a first air pressure sensor $S_1$ capable of sensing the air pressure therein, and the rear pneumatic suspension unit Sr is provided with a second air pressure sensor $S_2$ capable of sensing the air pressure therein. A speedometer Ms of the motorcycle M is incorporated with a vehicle speed sensor Ss (See FIG. 3). The rear pneumatic suspension unit Sr comprises two buffer air cylinders $Sr_1$, $Sr_2$ which are connected to the second air pressure sensor $S_2$ via communication conduits $C_1$, $C_2$, respectively, as shown in FIG. 2. The second air pressure sensor $S_2$ is connected via a line $C_3$ to a signal processor 13 which will be described later.

Each of the first and second air pressure sensors $S_1$, $S_2$ comprises a pressure switch, and is adapted to generate an output signal of a high level when the air pressure sensed is higher than a predetermined level. The relation between output levels of these air pressure sensors $S_1,S_2$ and variations in air pressures is shown in the following table.

TABLE 1

| Air pressure | Output level of air pressure sensors |
| --- | --- |
| Not less than predetermined level | High |
| Lower than predetermined level | Low |

Figure 1:
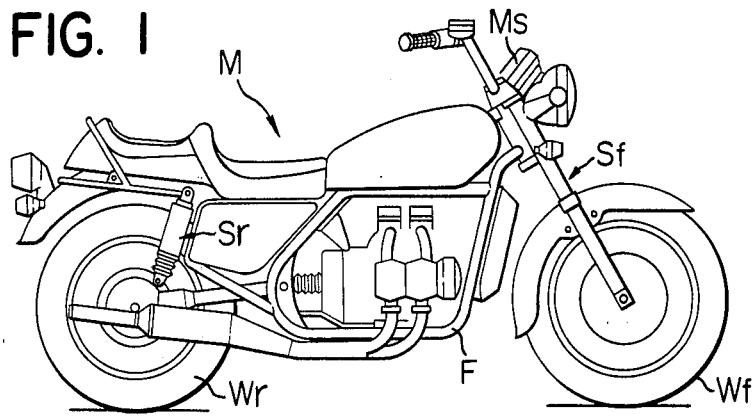
FIG. 1 is a side elevational view of a motorcycle provided with a device according to the present invention.
Figure 3:
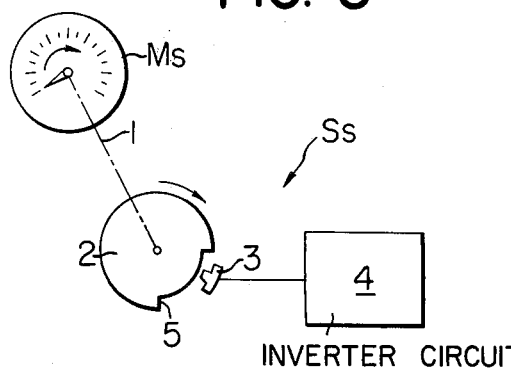
FIG. 3 is a front elevational view of a vehicle speed sensor.
Figure 4:
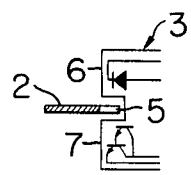
FIG. 4 is an enlarged longitudinal sectional view of a main portion of the vehicle sensor shown in FIG. 3.

The vehicle speed sensor Ss, which is shown in FIGS. 3,4, includes a speedometer Ms, an oscillatory plate 2 oscillated in accordance with the movement of a shaft 1 of a pointer of the speedometer Ms, a photoelectric means 3 mounted close to a peripheral portion of the oscillatory plate 2, and an inverter circuit 4 for inverting the output from the photoelectric means 3. The oscillatory plate 2 has a recess 5 in a peripheral portion thereof which has an angular extent corresponding to a certain angle of oscillation in turn corresponding to a certain range of vehicle speeds less than a predetermined value (for example, 16 km/h). The photoelectric means 3 is provided with a light emitter 6 and a light receiver 7. The photoelectric means 3 is adapted such that, when the vehicle speed is less than a predetermined level, the light from the light emitter 6 passes through the recess 5 to reach the light receiver 7, and when the vehicle speed is greater than a predetermined level, the light from the emitter 6 is intercepted by a non-recessed section of a peripheral portion of the oscillatory plate 2 due to the oscillation thereof in accordance with an increase in the vehicle speed so that the light does not reach the light receiver 7. When the light from the light emitter 6 does not reach the light receiver 7, the output from the photoelectric means 3 is at a low level so that a signal of high level is produced at the output of inverter circuit 4 which indicates that the vehicle speed is not less than a predetermined level.

The relation between the level of the output from the inverter circuit 4, i.e. the level of the output from the vehicle speed sensor Ss and variations in the vehicle speed is shown in the following table.

TABLE 2

| Vehicle speed | Output level of vehicle speed sensor |
| --- | --- |
| Lower than predetermined level | Low |
| Not less than predetermined level | High |

Figure 5:
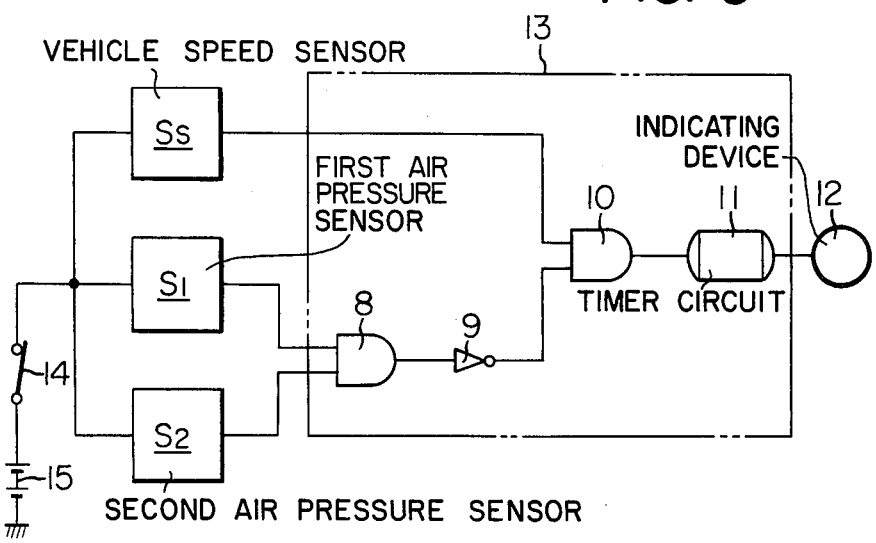
FIG. 5 is an electrical circuit diagram of a first embodiment of the present invention.

Referring to FIG. 5, output signals from the first and second pressure sensors $S_1$, $S_2$ are fed to the inputs of a first AND circuit 8, and the output signal from the first AND circuit 8 is inverted in an inverter 9, and fed to a second AND circuit 10 together with the output signal from the vehicle speed sensor Ss. The output signal from the second AND circuit 10 is fed to the input of a timer circuit 11. An output signal produced by the timer circuit 11 causes an alarm or indicating device 12 to be actuated. The indicating device 12 comprises a lamp or a buzzer, which is mounted in the dashboard on the motorcycle M.

The first and second AND circuits 8, 10, inverter 9, and timer circuit 11 constitute the signal processor 13 of the present invention. Reference numeral 14 denotes a main switch, and 15 a battery to complete the circuit.

The operation of the above embodiment will be described hereinafter.

First, the main switch 14 is closed.

When the vehicle speed is below a predetermined level, the output from the vehicle speed sensor Ss is at a low level. Accordingly, the output from the second AND circuit 10 is at a low level so that the indicating device 12 is not actuated irrespective of the output levels of the first and second pressure sensors $S_1$, $S_2$.

When both of the air pressures in the front and rear pneumatic suspension units Sf, Sr are not less than a predetermined level, both of the outputs from the first and second air pressure sensors $S_1$, $S_2$ are at a high level. Accordingly, the output from the first AND circuit 8, into which the outputs from the first and second air pressure sensors $S_1$, $S_2$ are fed, is at a high level. Since the output from the first AND circuit 8 is inverted by the inverter 9 to a low level, the output from the second AND circuit 10 is a low level. Therefore, the indicating device 12 is not actuated irrespective of the output level of the vehicle speed sensor Ss.

When the vehicle speed exceeds a predetermined level and the air pressure in one or both of the front and rear pneumatic suspension units Sf, Sr is below a predetermined level, the output of the vehicle speed sensor Ss is at a high level, and the output from one or both of the first and second air pressure sensors $S_1$, $S_2$ is at a low level. Therefore, an output signal of a low level is generated in the first AND circuit 8, and an output at a high level is produced by the inverter 9. The output of high level from the inverter 9 and the output of high level from the vehicle speed sensor Ss are simultaneously fed to the second AND circuit 10 so that an output of high level is generated therein. The output of high level from the second AND circuit 10 causes the timer circuit 11 to be energized. After a certain period of time (for example, 6 seconds) has elapsed, an output of high level generated in the timer circuit 11 will actuate the indicating device 12.

For example, when the motorcycle is running on a bumpy road, the air pressures in the first and second pneumatic suspension units Sf, Sr, which are generally kept not less than a predetermined level, are momentarily lowered below a predetermined level due to the buffer effect of these suspension units Sf, Sr thereby to cause the second AND circuit 10 to generate an output of high level which is fed into the timer circuit 11. However, this input time is too short to exceed the delayed time set by the timer circuit 11 so that the output from the timer circuit 11 remains at a low level. Accordingly, the indicating device 12 is not actuated.

Figure 6:
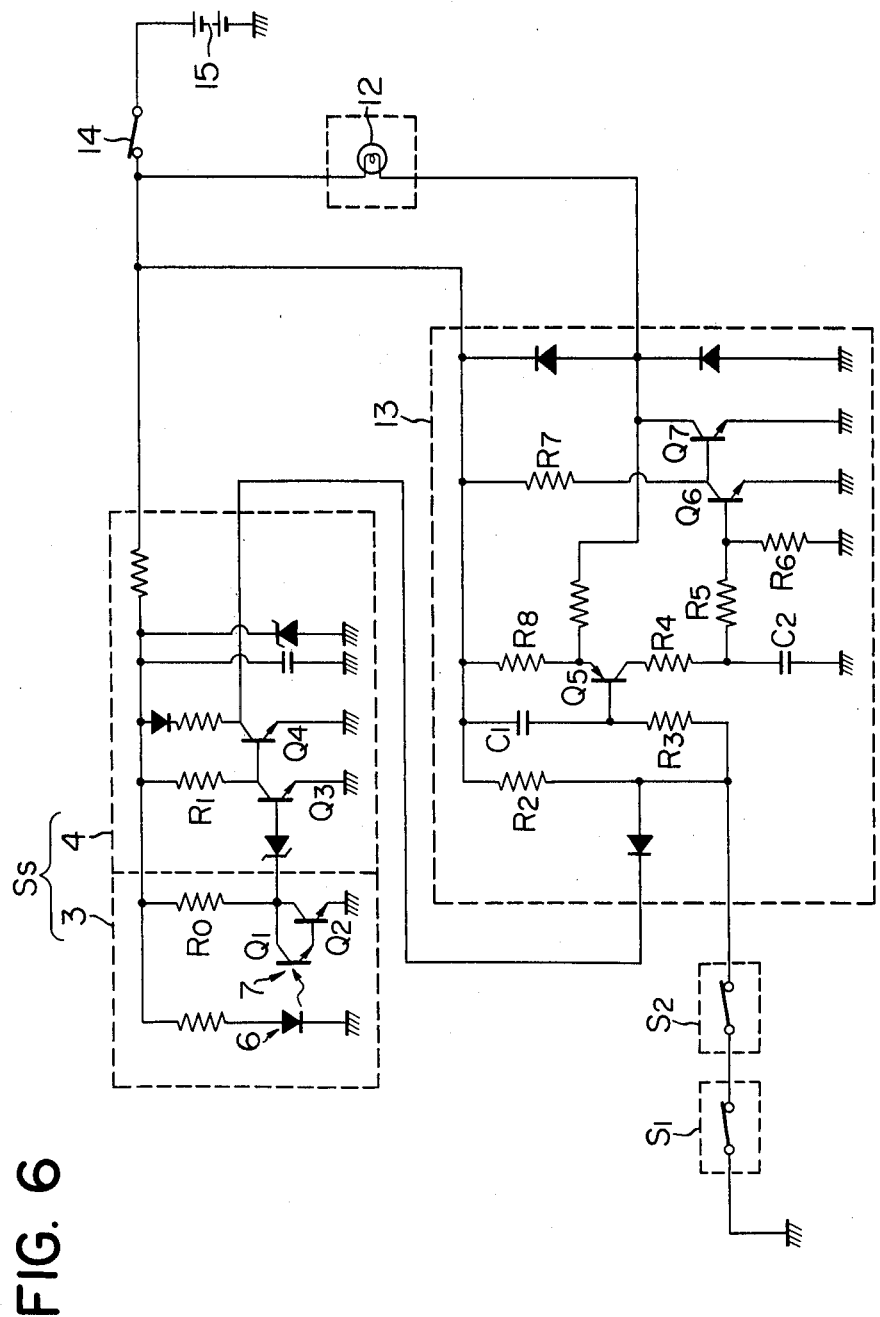
FIG. 6 is an electrical circuit diagram of a second embodiment of the present invention.

FIG. 6 shows another embodiment of the present invention, in which the same reference numerals and symbols are used for the parts corresponding to those of the first embodiment.

When the main switch 14 is closed, the light emitted from the light emitter 6 reaches the light receiver 7 (in the case where the vehicle speed is lower than a predetermined level) so that transistors $Q_1$, $Q_2$ are saturated. As a result, a transistor $Q_3$ is cut off. An electric current flows to the base of a transistor $Q_4$ through a resistor $R_1$ to saturate the transistor $Q_4$ and allow the output of the vehicle speed sensor to be grounded. Consequently, an output signal of low level is generated in the vehicle speed sensor Ss.

In the meantime, a capacitor $C_1$ in the signal processor 13 begins to be charged due to a resistor $R_3$ connected therein. However, the voltage of the capacitor $C_1$ does not reach a predetermined level until a predetermined period of time has elapsed, so that the base potential of a transistor $Q_5$ is not sufficiently low. Accordingly, transistors $Q_5$, $Q_6$ are kept cut off, to allow a transistor $Q_7$ to be saturated. Thus, an electric current flows to the indicating device 12.

When a predetermined period of time has elapsed after the capacitor $C_1$ begins to be charged, the base potential of the transistor $Q_5$ is sufficiently lowered so that the transistor $Q_5$ is saturated. Then, an electric current flows to a capacitor $C_2$ through a resistor $R_8$, transistor $Q_5$ and resistor $R_4$ to start charging the capacitor $C_2$. The electric current further flows to the base of the transistor $Q_6$ through the resistor $R_5$ so that the base potential thereof is increased to saturate the transistor $Q_6$. As a result, the base potential of the transistor $Q_7$ is lowered to cut off the transistor $Q_7$, and an electric current does not flow to the indicating device 12. Thus, the indicating device stops giving an indication.

By virtue of the above-described structure, an electric current is automatically supplied to the indicating device 12 for only a predetermined period of time after the main switch 14 has been closed. Therefore, faults in the indicating device 12 and the circuit for actuating the indicating device 12 can be detected each time the main switch 14 is operated.

When the vehicle speed exceeds a predetermined level, the light from the light emitter 6 is intercepted or does not reach the light receiver 7 so that the transistors $Q_1$, $Q_2$ are cut off. As a result, an electric current flows to the base of the transistor $Q_3$ through a resistor $R_0$ to increase the base potential of the transistor $Q_3$. Thus, the transistor $Q_3$ is saturated. Consequently, the base potential of the transistor $Q_4$ is lowered so that the transistor $Q_4$ is cut off to allow an output of high level to be generated in the vehicle speed sensor Ss.

When the air pressures in the front and rear pneumatic suspension units Sf, Sr are above a predetermined level and the switches for the first and second air pressure sensors $S_1$, $S_2$ are closed, the base potential of the transistor $Q_5$ is kept at a low level so that the transistor $Q_7$ is cut off. Consequently, an electric current does not flow to the indicating device 12.

When the air pressure in one or both of the front and rear pneumatic suspension units Sf, Sr is less than a predetermined level with the switch for one or both of the first and second air pressure sensors $S_1$, $S_2$ opened, in the circumstance that the vehicle speed exceeds a predetermined level with the output signal from the vehicle speed sensor Ss at a high level, the capacitor $C_1$ starts discharging through the resistors $R_2$, $R_3$. After a predetermined period of time has elapsed, the base potential of the transistor $Q_5$ is increased so that the transistor $Q_5$ is cut off. As a result, the capacitor $C_2$ starts discharging through the resistors $R_5$, $R_6$. When the base potential of the transistor $Q_6$ is lowered, the transistor $Q_6$ is cut off so that an electric current flows to the base of the transistor $Q_7$ through a resistor $R_7$. When the base potential of the transistor $Q_7$ is thus increased, the transistor $Q_7$ is saturated. As a consequence, an electric current flows to the indicating device 12 to energize the same to provide an indication.

In the above embodiments, the outputs from the first and second air pressure sensors $S_1$, $S_2$ are fed to the signal processor 13. However, one of the air pressure sensors $S_1$, $S_2$ may be omitted. Namely, the output from only one of the air pressure sensors $S_1$, $S_2$ may be fed to the signal processor 13.

As has been described in detail above, the present invention permits actuating the indicating device to give an indication when the air pressures in the pneumatic suspension units are lower than a predetermined level with the vehicle speed continuing to exceed a predetermined level for more than a predetermined period of time. Namely, the present invention contemplates sensing the air pressures in the pneumatic suspension units and if they continue to be below a level in a predetermined range while the vehicle is running at a speed in excess of a predetermined level, this condition is conveyed to the rider or driver. Therefore, the rider or driver is immediately informed of the necessity of repairing the pneumatic suspension units. In fact, the device according to the present invention is very useful to maintain the shock absorbing functions of the pneumatic suspension units in a normal condition. Moreover, the indicating device is not actuated in response to a momentary decrease in air pressure in the pneumatic suspension units which occurs while the vehicle is traveling, for example, on a bumpy road. In other words, the indicating device can be prevented from being erroneously actuated.

Since the signal processor provided in the device according to the present invention has a fault-checking circuit which permits automatically supplying electric current to the indicating device for a predetermined period of time when starting the signal processor, faults in the indicating device and the circuit for actuating the indicating device can be checked each time the main switch is operated.

Since the indicating device is adapted to be actuated when the vehicle speed is in excess of a predetermined value with the air pressure in one or both of the front and rear pneumatic suspension units continuing to be below a predetermined level for more than a predetermined period of time, suitable air pressures in the front and rear pneumatic suspension units can be accurately checked while the vehicle is running on a road with the total weight thereon acting on the vehicle. Moreover, the device according to the present invention prevents the indicating device from being erroneously actuated even when variations in air pressures in the pneumatic suspension units occur due to shock absorbing actions thereof while the vehicle is running on the road.

The present invention is not, of course, limited to the above-described embodiments and it may be modified in various ways withing the scope of the appended claims.

What is claimed is:

1. A device for sensing air pressure in pneumatic suspension units for a vehicle, said device comprising: air pressure sensor means for sensing air pressures in pneumatic suspension units to generate an output signal when the air pressures are below a predetermined level; vehicle speed sensor means for sensing vehicle speed to generate an output signal when the vehicle speed exceeds a predetermined level; signal processor means connected to receive output signals from said pressure sensor means and from said vehicle speed sensor means for generating an output when the air pressures in said pneumatic suspension units are below a predetermined level and the vehicle speed continues to be in excess of a predetermined level for more than a predetermined period of time, and indicating means connected to receive an output signal from said signal processor for producing an indicating signal.

2. A device as claimed in claim 1 wherein said air pressure sensor means comprises normally-closed switches which are closed when the pressures in said pneumatic suspension units are in a normal pressure range and which are opened when the pressures in said pneumatic units are below the normal pressure range, said vehicle speed sensor means comprising a vehicle speed sensing circuit which generates an output signal of relatively low level when the vehicle speed is below a predetermined level, and generates an output signal of relatively high level when the vehicle speed exceeds said predetermined level, said signal processor means comprising a first circuit for regulating output signals from said air pressures sensors to a relatively low level when said normally-closed switch is closed, and to a relatively high level when said normally-closed switch is opened, a second circuit which receives an output signal from said first circuit and an output signal from said vehicle speed sensor means and which generates a signal of a relatively high level, only when both of the output signals from said first circuit and said vehicle speed sensor means are at said relatively high levels, and a third circuit which receives an output signal from said second circuit and which generates an output signal for actuating said indicating means when said second circuit produces an output signal of a relatively high level continuously for more than a predetermined period of time.

3. A device as claimed in claim 1 wherein said signal processor means includes a fault checking circuit which permits checking normal operation of said indicating means by automatically supplying electric current to said indicating means for a predetermined period of time when said signal processor means is actuated.

4. A device as claimed in claim 1 wherein said signal processor means includes timer means for establishing said period of time beyond which the output from the signal processor means must be continued in order for the indicating means to be energized.

5. A device as claimed in claim 1 wherein said air pressure sensor means comprises two air pressure sensors connected to respective pneumatic suspension units, said signal processor means comprising a first circuit means connected to said air pressure sensors to produce a signal when at least one of said air pressure sensor means is at a level below said predetermined level, and a second circuit means connected to said first circuit means and to said vehicle speed sensor means and including time delay means for producing a signal when the first circuit means and said vehicle speed sensor means both produce output signals for more than said predetermined period of time.

6. A device for sensing air pressure in front and rear pneumatic suspension units of a motorcycle, said device comprising: first air pressure sensor means for sensing air pressure in the front pneumatic suspension unit to generate an output signal when the air pressure is below a predetermined level; second air pressure sensor means for sensing air pressure in the rear pneumatic suspension unit to generate an output signal when the air pressure is below a predetermined level; vehicle speed sensor means for sensing vehicle speed to generate an output signal when the vehicle speed exceeds a predetermined level; signal processor means connected to receive outputs from both said air pressure sensor means and said vehicle speed sensor means for generating an output signal when it receives an output signal from at least one of said air pressure sensor means and also an output signal from said vehicle speed sensor means continuously for more than a predetermined period of time; and indicating means actuated by an output signal from said signal processor for producing an indicating signal.

7. A device as claimed in claim 6 wherein said air pressure sensor means comprises normally-closed switches which are closed when the pressures in said pneumatic suspension units are in a normal pressure range and which are opened when the pressures in said pneumatic units are below the normal pressure range, said vehicle speed sensor means comprising a vehicle speed sensing circuit which generates an output signal of relatively low level when the vehicle speed is below a predetermined level, and generates an output signal of relatively high level when the vehicle speed exceeds said predetermined level, said signal processor means comprising a first circuit for regulating output signals from said air pressure sensors to a relatively low level when said normally-closed switch is closed, and to a relatively high level when said normally-closed switch is opened, a second circuit which receives an output signal from said first circuit and an output signal from said vehicle speed sensor means and which generates a signal of a relatively high level, only when both of the output signals from said first circuit and said vehicle speed sensor means are at said relatively high levels, and a third circuit which receives an output signal from said second circuit and which generates an output signal for actuating said indicating means when said second circuit produces an output signal of a relatively high level continuously for more than a predetermined period of time.

8. A device as claimed in claim 6 wherein said signal processor means includes a fault checking circuit which permits checking normal operation of said indicating means by automatically supplying electric current to said indicating means for a predetermined period of time when said signal processor means is actuated.

9. A device as claimed in claim 6 wherein said signal processor means includes timer means for establishing said period of time beyond which the output from the signal processor means must be continued in order for the indicating means to be energized.

10. A device as claimed in claim 6 wherein said air pressure sensor means comprises two air pressure sensors connected to respective pneumatic suspension units, said signal processor means comprising a first circuit means connected to said air pressure sensors to produce a signal when at least one of said air pressure sensor means is at a level below said predetermined level, and a second circuit means connected to said first circuit means and to said vehicle speed sensor means and including time delay means for producing a signal when the first circuit means and said vehicle speed sensor means both product output signals for more than said predetermined period of time.

11. A method of sensing air pressure in pneumatic suspension units for vehicles, said method comprising: sensing air pressures in pneumatic suspension units and generating a signal when the air pressures are below a predetermined level; sensing vehicle speed and generating a signal when the vehicle speed exceeds a predetermined level; generating an output signal when the air pressures in said pneumatic suspension units are below a predetermined level and the vehicle speed continues to be in excess of a predetermined level for more than a predetermined period of time; and generating an indicating signal when said output signal is produced.

12. A method of sensing air pressure in front and rear pneumatic suspension units of a motorcycle, said method comprising: sensing the air pressure in the front pneumatic suspension unit and generating an output signal when the air pressure is below a predetermined level; sensing the air pressure in the rear pneumatic suspension unit and generating an output signal when the air pressure is below a predetermined level; sensing vehicle speed and generating an output signal when the vehicle speed exceeds a predetermined level; generating an output signal by a processor when the air pressure in at least one of said suspension units produces a respective output signal while also an output signal is produced indicating vehicle speed continuously exceeds said predetermined level for more than a predetermined period of time; and generating an indication when the processor produces an output signal.

* * * * *